(12) United States Patent
Huang

(10) Patent No.: US 9,347,602 B2
(45) Date of Patent: May 24, 2016

(54) ADJUSTING APPARATUS

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 20 days.

(21) Appl. No.: 14/603,364

(22) Filed: Jan. 23, 2015

(65) Prior Publication Data

US 2016/0018055 A1 Jan. 21, 2016

(30) Foreign Application Priority Data

Jul. 15, 2014 (TW) .............................. 103212538 U

(51) Int. Cl.
| | |
|---|---|
| *F16M 11/14* | (2006.01) |
| *F16M 11/18* | (2006.01) |
| *G03B 21/54* | (2006.01) |
| *F16M 11/08* | (2006.01) |
| *F16M 13/02* | (2006.01) |
| *F16M 11/12* | (2006.01) |
| *F16M 11/04* | (2006.01) |

(52) U.S. Cl.
CPC .............. *F16M 11/08* (2013.01); *F16M 11/04* (2013.01); *F16M 11/125* (2013.01); *F16M 11/126* (2013.01); *F16M 13/022* (2013.01); *F16M 13/027* (2013.01)

(58) Field of Classification Search
CPC ... F16M 13/027; F16M 13/022; F16M 11/08; F16M 11/125; F16M 11/14; F16M 11/04; G08B 13/1409
USPC ........................ 248/125.7, 317, 324, 343, 329
See application file for complete search history.

(56) References Cited

U.S. PATENT DOCUMENTS

| | | | | | |
|---|---|---|---|---|---|
| 5,938,161 | A | * | 8/1999 | Takeuchi ............... | F16M 11/08 248/329 |
| 2009/0294619 | A1 | * | 12/2009 | David .................... | F16M 11/04 248/324 |
| 2012/0168391 | A1 | * | 7/2012 | Liu ....................... | F16M 11/105 211/26 |
| 2012/0224152 | A1 | * | 9/2012 | Kelly ................... | G03B 21/142 353/100 |
| 2012/0256071 | A1 | * | 10/2012 | Dittmer ................. | F16M 11/04 248/323 |
| 2013/0264434 | A1 | * | 10/2013 | Unno .................... | G03B 21/14 248/58 |

FOREIGN PATENT DOCUMENTS

| | | | | |
|---|---|---|---|---|
| CN | 202756858 | | 2/2013 | |
| TW | 2426392 | A2 * | 3/2012 | ............. F16M 11/12 |
| TW | 2639489 | A2 * | 9/2013 | ............. F16M 11/08 |

* cited by examiner

*Primary Examiner* — Anita M King
(74) *Attorney, Agent, or Firm* — Jianq Chyun IP Office

(57) ABSTRACT

An adjusting apparatus including first and second bases, a pivot shaft, an adjusting unit and a first cable is provided. The second base is disposed under the first base. The first and second bases are pivoted by the pivot shaft. The adjusting unit includes a first adjusting base and a first adjusting rod. The first adjusting rod is passed through the first base and the first adjusting base. The first cable has first and second sections, wherein the first and second sections have first end portions, the first end portions are fixed to the second base, and the first and second sections are held by the first adjusting base. When the first adjusting rod is rotated, the first adjusting base is moved relative first base, such that the first or second section is dragged and the second base is rotated around a first axis relative to the first base.

18 Claims, 11 Drawing Sheets

ADJUSTING APPARATUS

CROSS-REFERENCE TO RELATED APPLICATION

This application claims the priority benefit of Taiwan application serial no. 103212538, filed on Jul. 15, 2014. The entirety of the above-mentioned patent application is hereby incorporated by reference herein and made a part of this specification.

BACKGROUND OF THE DISCLOSURE

1. Field of the Disclosure

The disclosure relates to an adjusting apparatus and more particularly, to an adjusting apparatus capable of adjusting angle.

2. Description of Related Art

Meeting rooms, auditoriums, or the like, may be provided with projectors mostly hung on the ceiling. Commonly, the adjusting apparatus used for hanging the projector is required to be capable for rotating and adjusting the projector to adjust the projected image.

In order to achieve the object of adjusting projectors, the abovementioned adjusting apparatus may generally be provided with an adjusting mechanism, and users may control the angle of the projector relative to different axes, such as x-axis, y-axis, or z-axis, via the adjusting mechanism.

China Utility Model Patent No. CN 202756858 U discloses an adjusting base frame for a projector, using three adjusting apparatuses for three-axial rotation, wherein each adjusting apparatus has a shaft and two dragging cables assembled to a rotating rod. The rotating rod has a left handed thread section and a right handed thread section, respectively screwed to corresponding threaded sleeves. The two dragging cables are respectively connected to the corresponding threaded sleeve. When the shaft rotates forwardly or reversely, the two dragging cables may be released or tightened, so that the projector may perform two-directional rotation around each axis. However, the structure of the whole apparatus may become complex and cause the operation unstable due to many parts. It may also increase the manufacturing cost.

SUMMARY OF THE DISCLOSURE

The disclosure provides an adjusting apparatus, which has a convenient adjusting structure and meets the need of simplified structure design.

The adjusting apparatus of the disclosure includes a first base, a second base, a pivot shaft, an adjusting unit and a first cable. The first base is used to fix a first object. The second base is disposed under the first base, and used to assemble a second object. The pivot shaft pivots the first base and the second base, and parallel to a first axis. The adjusting unit includes a first adjusting base and a first adjusting rod. The first adjusting base is disposed on the first base and configured to move back and forth along a direction parallel to a second axis. The first adjusting rod is parallel to the second axis and rotatably disposed on the first base. The first adjusting base is disposed around the first adjusting rod. The first cable has a first section and a second section, wherein the first section and the second section respectively have a first end portion, and the first end portions are fixed to the second base, and the first adjusting base holds the first section and the second section. When the first adjusting rod is rotated, the first adjusting base moves on the second axis relative to the first base, for dragging the first end portion of the first section or the first end portion of the second section, such that the second base is rotated relative to the first base around the first axis.

According to an exemplary embodiment of the disclosure, the first adjusting base has a first recess portion, and the first cable further has a first protruding portion. The first protruding portion connects the first section and the second section and is accommodated in the first recess portion.

According to an exemplary embodiment of the disclosure, the first adjusting rod has a first thread, and the first adjusting base has a first threaded hole. The first thread is engaged with the first threaded hole. When the first adjusting rod is rotated, no relative replacement exists between the first adjusting rod and the first base.

According to an exemplary embodiment of the disclosure, the second base has two bent plates corresponding to the first end portion of the first section and the first end portion of the second section. Each of the bent plates has a position limiting narrow slot. The first end portion of the first section and the first end portion of the second section respectively have a protruding block, and the protruding blocks are correspondingly inserted in the position limiting narrow slots.

According to an exemplary embodiment of the disclosure, the adjusting apparatus further includes a pivot base and a second cable. The pivot base is fixed on the second base, and the pivot shaft passes through the pivot base so that the first base is pivoted to the pivot base. The second cable has a third section and a fourth section, wherein the third section and the fourth section respectively have a second end portion, and the second end portions are fixed to two opposite sides of the pivot base. The adjusting unit further includes a second adjusting base and a second adjusting rod. The second adjusting base is disposed on the first base and configured to move back and forth along a direction parallel to the second axis, and holds the third section and the fourth section. The second adjusting rod is arranged along a third axis, and the third axis is perpendicular to the first axis or the second axis. The second adjusting rod is rotatably disposed on the first base, and the second adjusting base is disposed around the second adjusting rod. When the second adjusting rod is rotated, the second adjusting base moves relative to the first base on the second axis, for dragging the second end portion of the third section or the second end portion of the fourth section, such that the pivot base and the second base are rotated relative to the first base around the second axis.

According to an exemplary embodiment of the disclosure, the second adjusting base has a second recess portion, and the second cable further has a second protruding portion. The second protruding portion connects the third section and the fourth section and is accommodated in the second recess portion.

According to an exemplary embodiment of the disclosure, the second adjusting rod has a second thread, and the second adjusting base has a second threaded hole. The second thread is engaged with the second threaded hole. When the second adjusting rod is rotated, no relative replacement exists between the second adjusting rod and the first base.

According to an exemplary embodiment of the disclosure, the adjusting apparatus further includes a third cable, wherein the third cable has a fifth section and a sixth section. The fifth section and the sixth section respectively have a third end portion, and the third end portions are fixed to another two opposite sides of the pivot base. The adjusting unit further includes a third adjusting base and a third adjusting rod. The third adjusting base is disposed on the first base and configured to move back and forth along a direction parallel to the second axis, and holds the fifth section and the sixth section. The third adjusting rod passes through the first base and the third adjusting base, the first adjusting rod and the third adjusting rod are located at two sides of the second adjusting rod, and the third adjusting rod is rotatably disposed on the first base, and the third adjusting base is disposed around the third adjusting rod. When the third adjusting rod is rotated, the third adjusting base moves relative to the first base on the second axis, for dragging the third end portion of the fifth section or the third end portion of the sixth section, such that the pivot base and the second base are rotated relative to the first base around the third axis.

According to an exemplary embodiment of the disclosure, the third adjusting base has a third recess portion, and the third cable further has a third protruding portion. The third protruding portion connects the fifth section and the sixth section and is accommodated in the third recess portion.

According to an exemplary embodiment of the disclosure, the third adjusting rod has a third thread, and the third adjusting base has a third threaded hole. The third thread is engaged with the third threaded hole. When the third adjusting rod is rotated, no relative replacement exists between the third adjusting rod and the first base.

According to an exemplary embodiment of the disclosure, the pivot base has a plurality of guiding posts disposed at a periphery of the pivot base. The first base has a plurality of through holes corresponding to the guiding posts. When the pivot base is rotated relative to the first base, the guiding posts slide within the through holes. In addition, each of the guiding posts has a groove. When each of the guiding posts slides within the corresponding through hole, the guiding post is partially deformed via the groove and propped against within the through hole.

According to an exemplary embodiment of the disclosure, the first base has a first pivoting portion facing the pivot base, and the pivot base has a second pivoting portion corresponding to the first pivoting portion. The first pivoting portion and the second pivoting portion respectively have a first pivoting surface and a second pivoting surface. The first pivoting surface and the second pivoting surface are rotatably connected, and a shape of the first pivoting surface and a shape of the second pivoting surface are complementary to each other, wherein the first pivoting surface and the second pivoting surface are respectively hemispherical surfaces.

According to an exemplary embodiment of the disclosure, the first pivoting surface and the second pivoting surface are respectively hemispherical surfaces.

According to an exemplary embodiment of the disclosure, the adjusting apparatus further includes a pressing member, wherein the pivot shaft passes through the pressing member, so that the first base is held between the pivot base and the pressing member.

According to an exemplary embodiment of the disclosure, the pressing member has a third pivoting portion facing the first base, and the third pivoting portion has a third pivoting surface. The first pivoting portion further has a fourth pivoting surface corresponding to the first pivoting surface. The third pivoting surface and the fourth pivoting surface are rotatably connected, and a shape of the third pivoting surface and a shape of the fourth pivoting surface are complementary to each other.

According to an exemplary embodiment of the disclosure, the third pivoting surface and the fourth pivoting surface are respectively hemispherical surfaces.

According to an exemplary embodiment of the disclosure, the third pivoting surface and the first pivoting surface partially contact.

In light of the above, in the adjusting apparatus of the disclosure, the first adjusting base holds the first section and the second section of the first cable, and may drag the first section or the second section so that the second base is rotated relative to the first base, so as to drive the second object to rotate relative to the first object. Accordingly, disposing complex structure is unnecessary for the adjusting apparatus, thus malfunction possibility of the adjusting apparatus may be reduced. Furthermore, since the adjusting apparatus is simple in structure, number of parts and manufacturing cost may be reduced.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
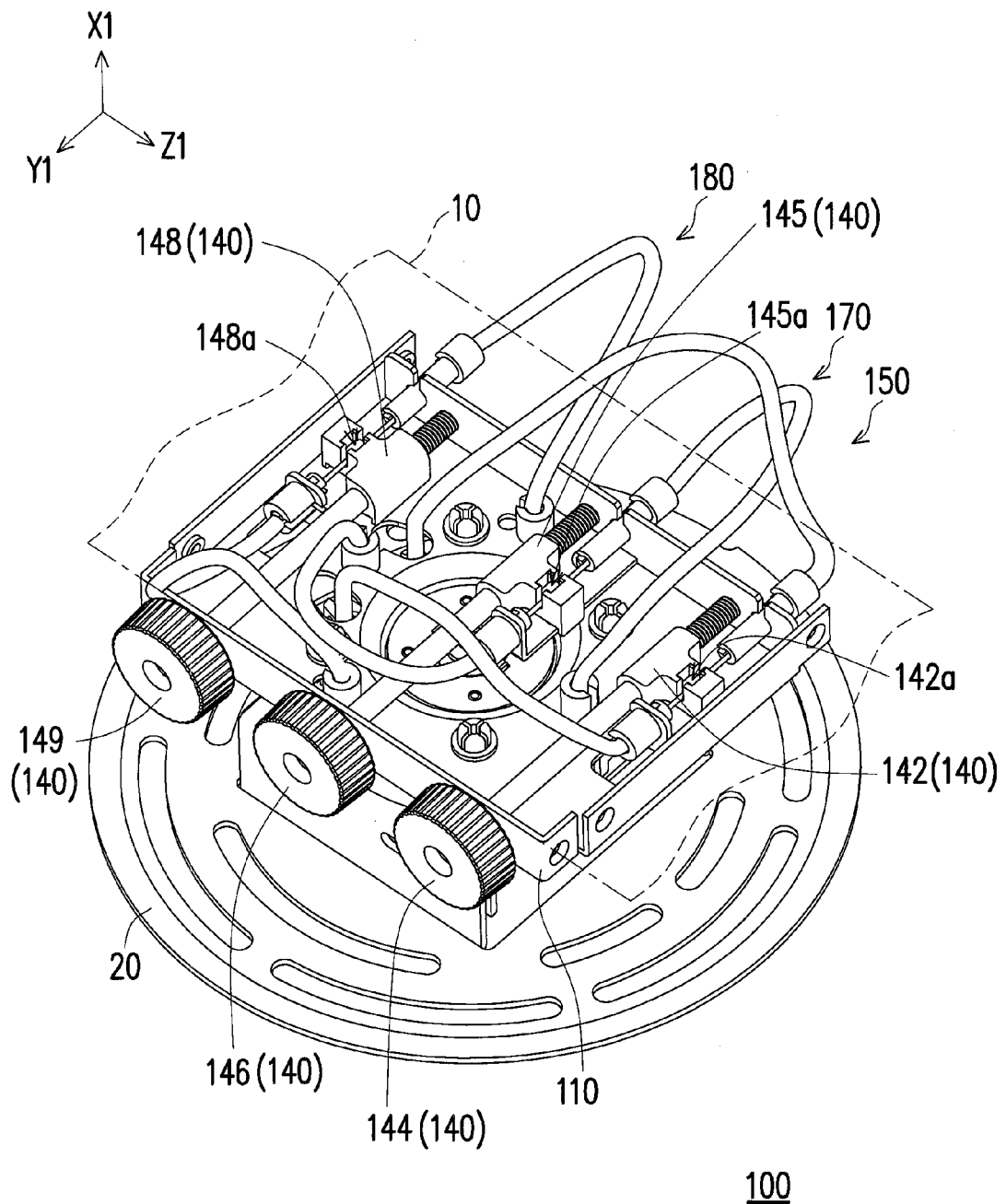
FIG. 1 is a schematic view showing an adjusting apparatus connecting a first object and a second object according to an embodiment of the disclosure.
Figure 2:
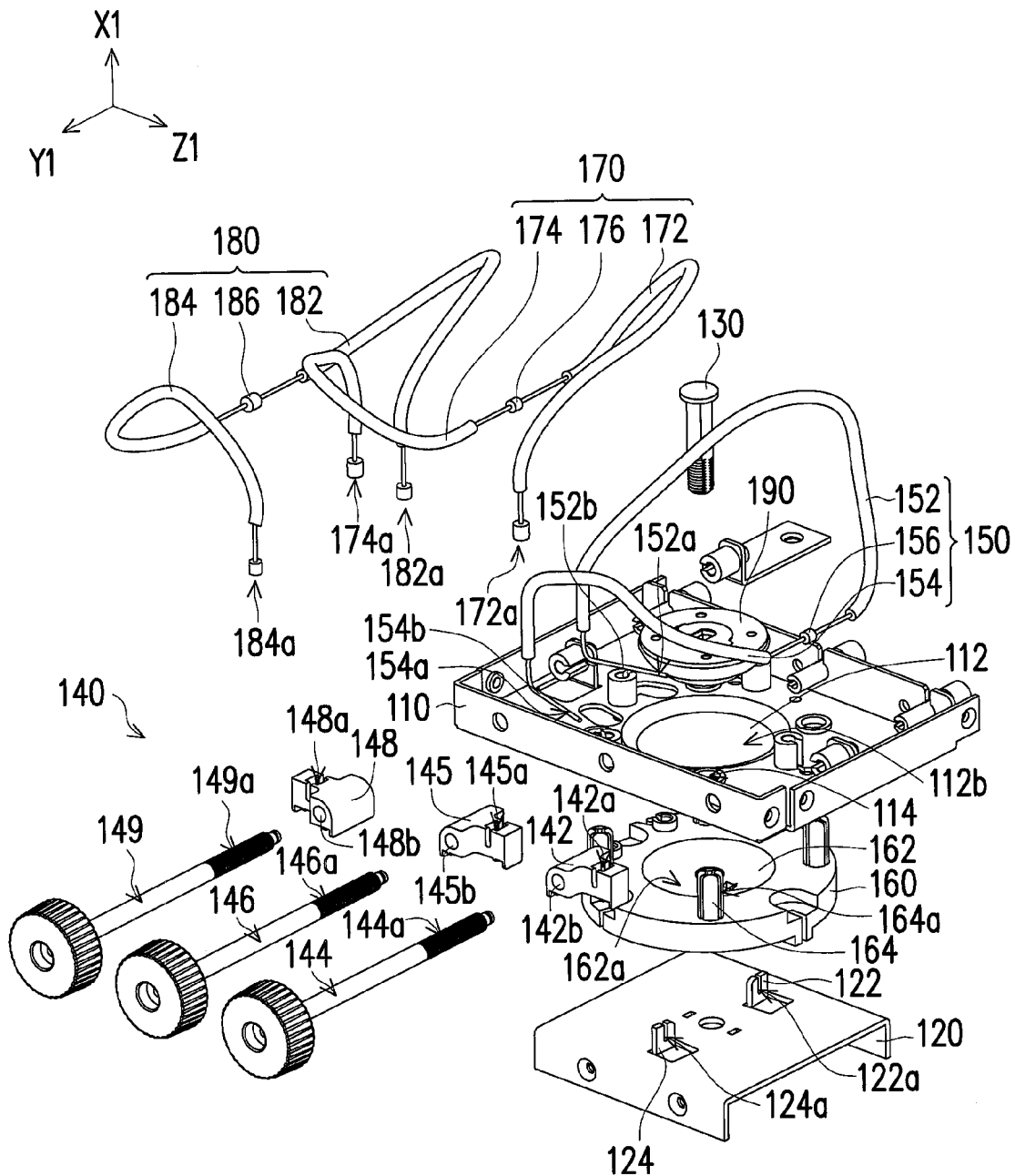
FIG. 2 is an exploded view of the adjusting apparatus in FIG. 1.
Figure 3:
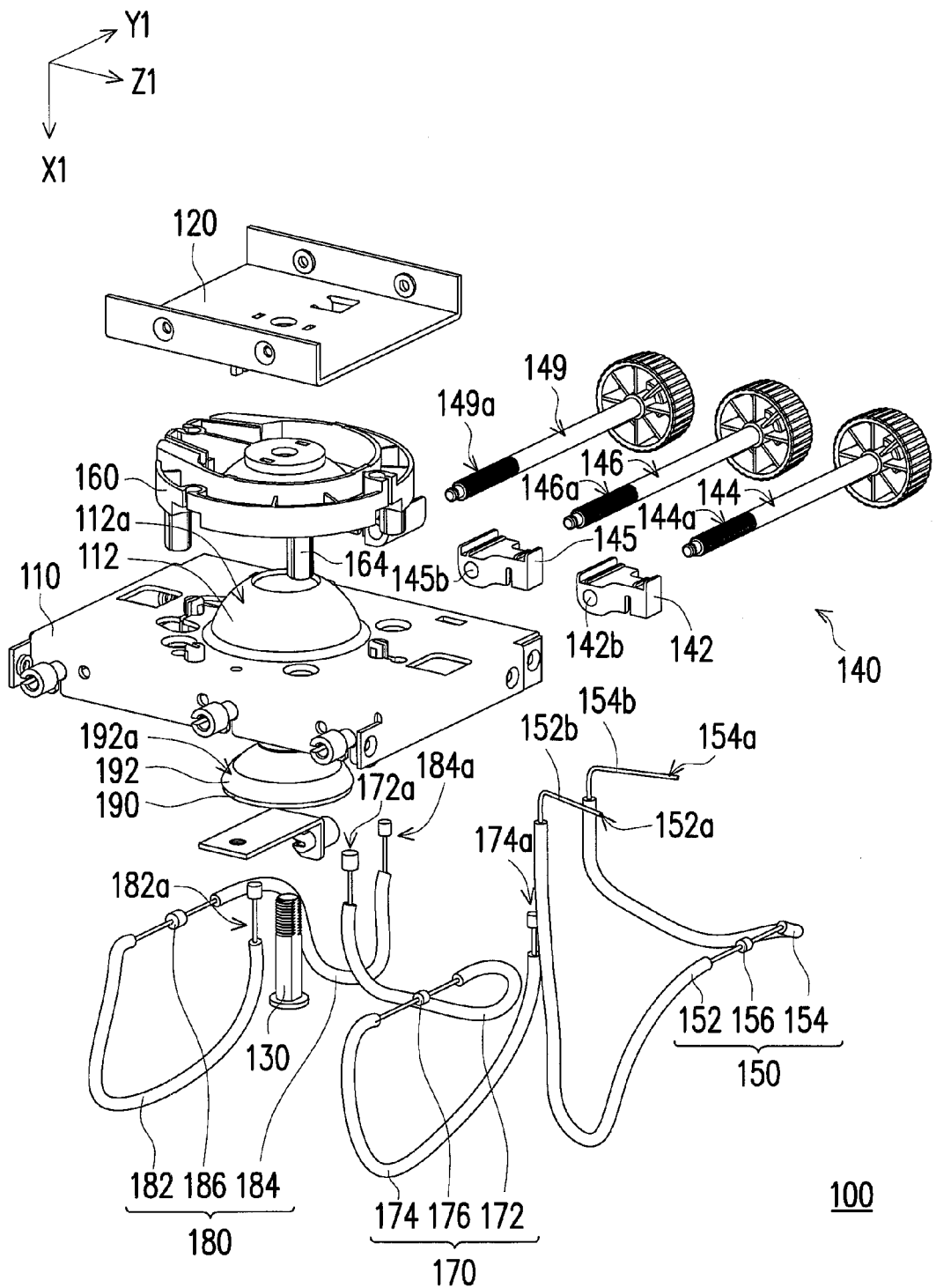
FIG. 3 is another exploded view of the adjusting apparatus in FIG. 1.

FIG. 1 is a schematic view showing an adjusting apparatus connecting a first object and a second object according to an embodiment of the disclosure. FIG. 2 is an exploded view of the adjusting apparatus in FIG. 1. FIG. 3 is another exploded view of the adjusting apparatus in FIG. 1. Referring to FIG. 1, FIG. 2 and FIG. 3, in the embodiment, the adjusting apparatus 100 is used to fix a first object 10 and assemble the second object 20. That is, the second object 20 may rotate around a first axis X1, a second axis Y1, or a third axis Z1 relative to the first object 10 via the adjusting apparatus 100.

First, the following description is about the first object 10 rotating around the first axis X1 and changing the relative positions. The adjusting apparatus 100 includes a first base 110, a second base 120, a pivot shaft 130, an adjusting unit 140 and a first cable 150. In addition, the first object 10 of the embodiment is a fixing base which is screwed on a ceiling (not shown) and fixed on the first base 110, and the second object 20 is a disk element for assembling a projector (not shown) and assembled with the second base 120 via screws (not shown), for example. It should be mentioned that, for the sake of clearness of the drawings, the first object 10 is just partially shown in FIG. 1.

As described above, the second base 120 is disposed under the first base 110. The first base 110 and the second base 120 pivot through the pivot shaft 130. The pivot shaft 130 is parallel to the first axis X1, and an end portion of the pivot shaft 130 is fixed at the bottom of the second base 120 via nuts (not shown). The adjusting unit 140 includes a first adjusting base 142 and a first adjusting rod 144. The first adjusting base 142 is disposed on the first base 110. The first adjusting rod 144 is parallel to the second axis Y1, and passes through the first base 110 and the first adjusting base 142. The first axis X1 and the second axis Y1 are perpendicular to each other, but not limited thereto. The first cable 150 has a first section 152 and a second section 154, wherein the first section 152 and the second section 154 respectively have a first end portion 152a, 154a, and the first end portions 152a, 154a are fixed to the second base 120, and the first adjusting base 142 holds the first section 152 and the second section 154.

Figure 4A:
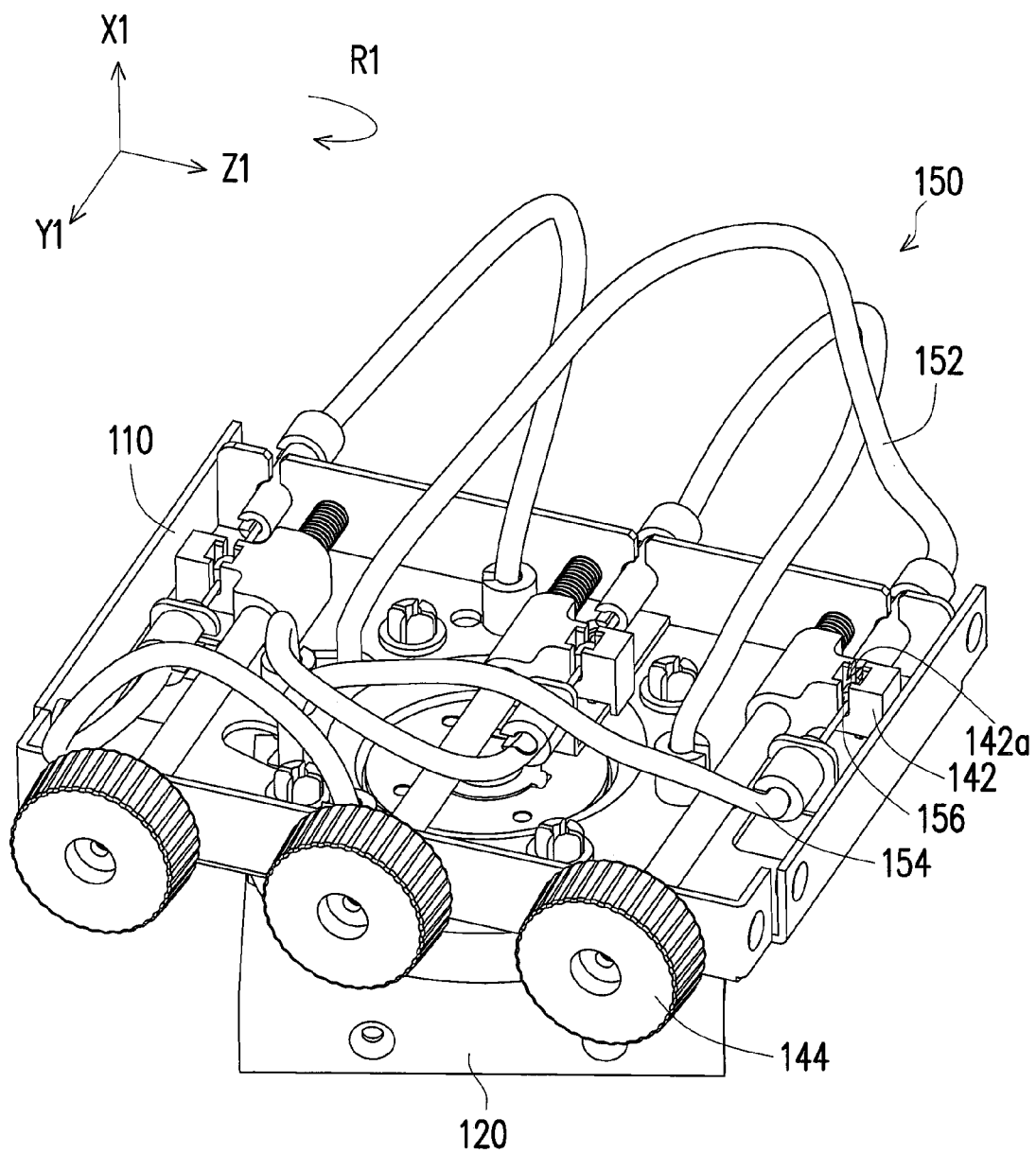
FIG. 4A is a schematic view showing the adjusting apparatus in FIG. 1 rotating around the first axis.
Figure 4B:
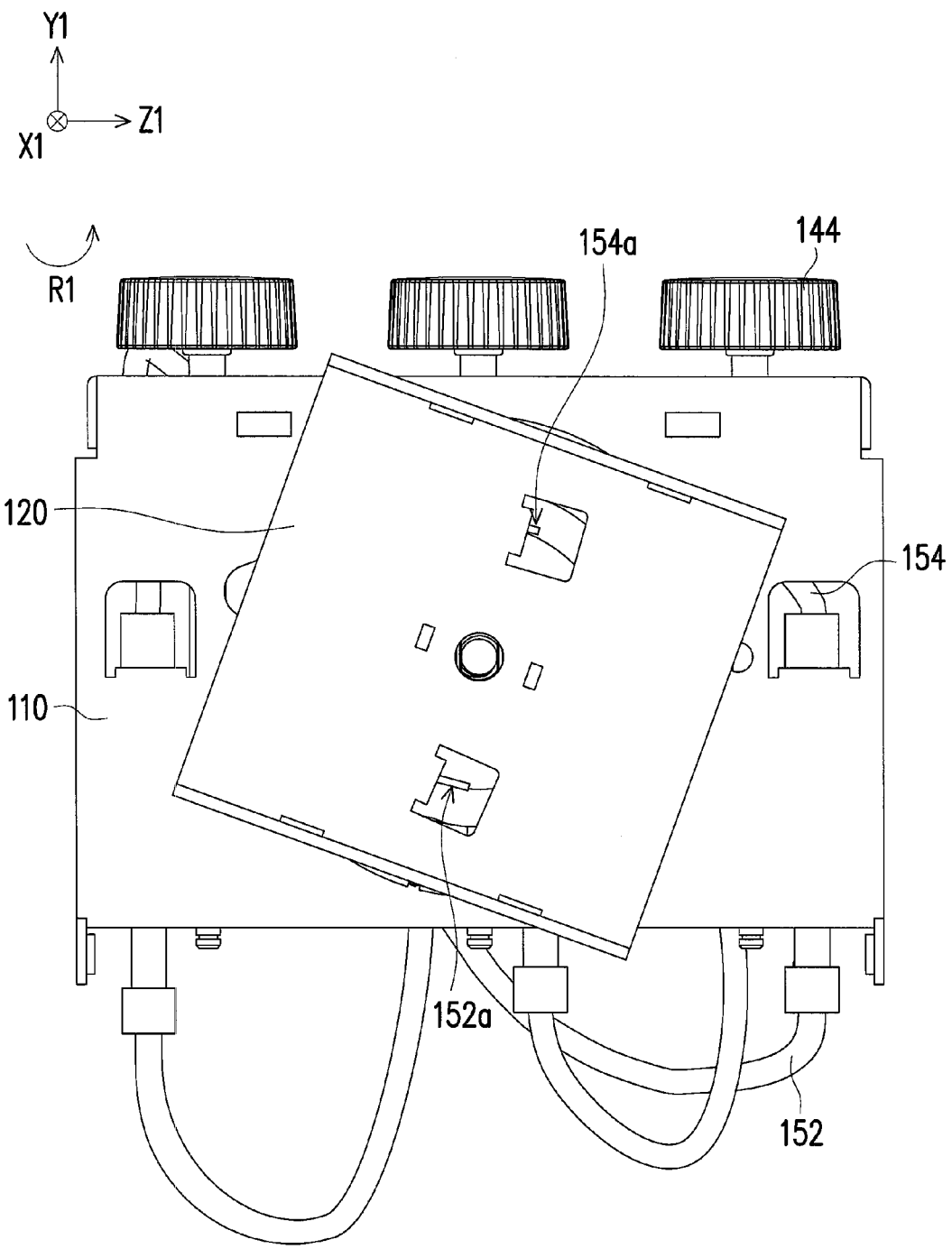
FIG. 4B is a bottom view of the adjusting apparatus in FIG. 4A.

FIG. 4A is a schematic view showing the adjusting apparatus in FIG. 1 rotating around the first axis. FIG. 4B is a bottom view of the adjusting apparatus in FIG. 4A. Please refer to FIG. 1, FIG. 2, FIG. 4A and FIG. 4B. When the first adjusting rod 144 is rotated, the first adjusting base 142 moves in a reverse direction on the second axis Y1 relative to the first base 110, for dragging the second section 154 of the first cable 150, such that the first end portion 154a of the second section 154 drives the second base 120 to rotate relative to the first base 110 around the first axis X1 along the rotation direction R1. Thus, the second object 20 rotates in one direction around the first axis X1 relative to the first object 10.

On the contrary, when the first adjusting rod 144 is reversely rotated and drives the first adjusting base 142 of the adjusting unit 140 to move on the second axis Y1 relative to the first base 110, the first section 152 of the first cable 150 is dragged, such that the first end portion 152a of the first section 152 drives the second base 120 to rotate relative to the first base 110 around the first axis X1 along a reverse direction of the rotation direction R1 (not shown). Thus, the second object 20 rotates in another direction around the first axis X1 relative to the first object 10.

In addition, referring to FIG. 1, FIG. 2 and FIG. 4A, the first adjusting base 142 of the embodiment has a first recess portion 142a, and the first cable 150 further has a first protruding portion 156 which connects the first section 152 and the second section 154. The first protruding portion 156 may be manufactured by a suitable process. For instance, the connection portion of the first section 152 and the second section 154 may be applied a forging process, so that the connection portion is deformed to form the first protruding portion 156. The first protruding portion 156 of the first cable 150 may be inserted into or removed from the first recess portion 142a of the first adjusting base 142 along a direction parallel to the first axis X1, thus convenience of the assembling of the first adjusting base 142 and the first cable 150 may be improved. In addition, when the first protruding portion 156 is accommodated in the first recess portion 142a, any movement parallel to the second axis Y1 is limited and locked by the first recess portion 142a. That effectively keeps the first cable 150 from releasing, and the reliability of the adjusting apparatus 100 may be ensured.

In addition, the second base 120 has two bent plates 122, 124 corresponding to the first end portion 152a of the first section 152 and the first end portion 154a of the second section 154. Each of the bent plates 122, 124 has a position limiting narrow slot 122a, 124a, respectively. The first end portion 152a of the first section 152 and the first end portion 154a of the second section 154 respectively have a protruding block 152b, 154b, and the protruding blocks 152b, 154b are correspondingly inserted in the position limiting narrow slots 122a, 124a.

It should be mentioned that the first adjusting rod 144 is rotatably disposed at the first base 110 and passes through the first base 110. However, the first adjusting rod 144 may not move back or move forth relative to the first base 110 when being rotated. Additionally, the first adjusting rod 144 has a first thread 144a, the first adjusting base 142 has a first threaded hole 142b. The first adjusting base 142 sleeves on the first adjusting rod 144 and the first thread 144a is engaged with the first threaded hole 142b. As such, when the first adjusting rod 144 is rotated, the first adjusting base 142 may move on the second axis Y1 relative to the first adjusting rod 144, namely, may move relative to the first base 110, and drives the first section 152 of the first cable 150 or the second section 154 of the first cable 150.

In such configuration, the two sections of the first cable 150 is held by the first adjusting base 142 and the first adjusting rod 144 drives the first adjusting base 142, therefore the second object 20 may perform two-directional rotation around the first axis X1 relative to the first object 10. Thus, the adjusting apparatus 100 may change the relative positions between the first object 10 and the second object 20. With the less complex structure, malfunction possibility of the adjusting apparatus 100 may be reduced. Furthermore, the number of parts and manufacturing cost of the adjusting apparatus 100 may be reduced.

By using the concept mentioned above, the first object 10 and the second object 20 may be rotated around the second axis Y1 or the third axis Z1 and change the relative positions via the adjusting apparatus 100, the detailed description is as the following.

Referring to FIG. 1, FIG. 2 and FIG. 3, in the embodiment, the adjusting apparatus 100 further includes a pivot base 160, a second cable 170 and a third cable 180. In addition, the adjusting unit 140 further includes a second adjusting base 145, a second adjusting rod 146, a third adjusting base 148 and a third adjusting rod 149. The pivot base 160 is fixed on the second base 120, and the pivot shaft 130 passes through the pivot base 160 so that the first base 110 is pivoted to the pivot base 160. The second cable 170 has a third section 172 and a fourth section 174, and the third cable 180 has a fifth section 182 and a sixth section 184. The third section 172 and the fourth section 174 respectively have a second end portion 172a, 174a, and the fifth section 182 and the sixth section 184 respectively have a third end portion 182a, 184a, wherein the two second end portions 172a, 174a are fixed to the two opposite sides of the pivot base 160, and the two third end portions 182a, 184a are fixed to another two opposite sides of the pivot base 160.

As described above, the second adjusting base 145 and the third adjusting base 148 are disposed on the first base 110. The second adjusting base 145 holds the third section 172 and the fourth section 174, and the third adjusting base 148 holds the fifth section 182 and the sixth section 184. As shown in FIG. 2, the third adjusting rod 149 and the second adjusting rod 146 are parallel to the second axis Y1 respectively and sequentially arranged along the third axis Z1, and the first adjusting rod 144 and the third adjusting rod 149 are located at two sides of the second adjusting rod 146. The third axis Z1 is perpendicular to the first axis X1 or the second axis Y1, but not limited thereto. The second adjusting rod 146 passes through the first base 110 and the second adjusting base 145, and the third adjusting rod 149 passes through the first base 110 and the third adjusting base 148. In addition, the second object 20 may be rotated around the second axis Y1 relative to the first object 10 via the cooperation of the pivot base 160, the second cable 170 and the adjusting unit 140, and the second object 20 may be rotated around the third axis Z1 relative to the first object 10 via the cooperation of the pivot base 160, the third cable 180 and the adjusting unit 140.

Figure 5A:
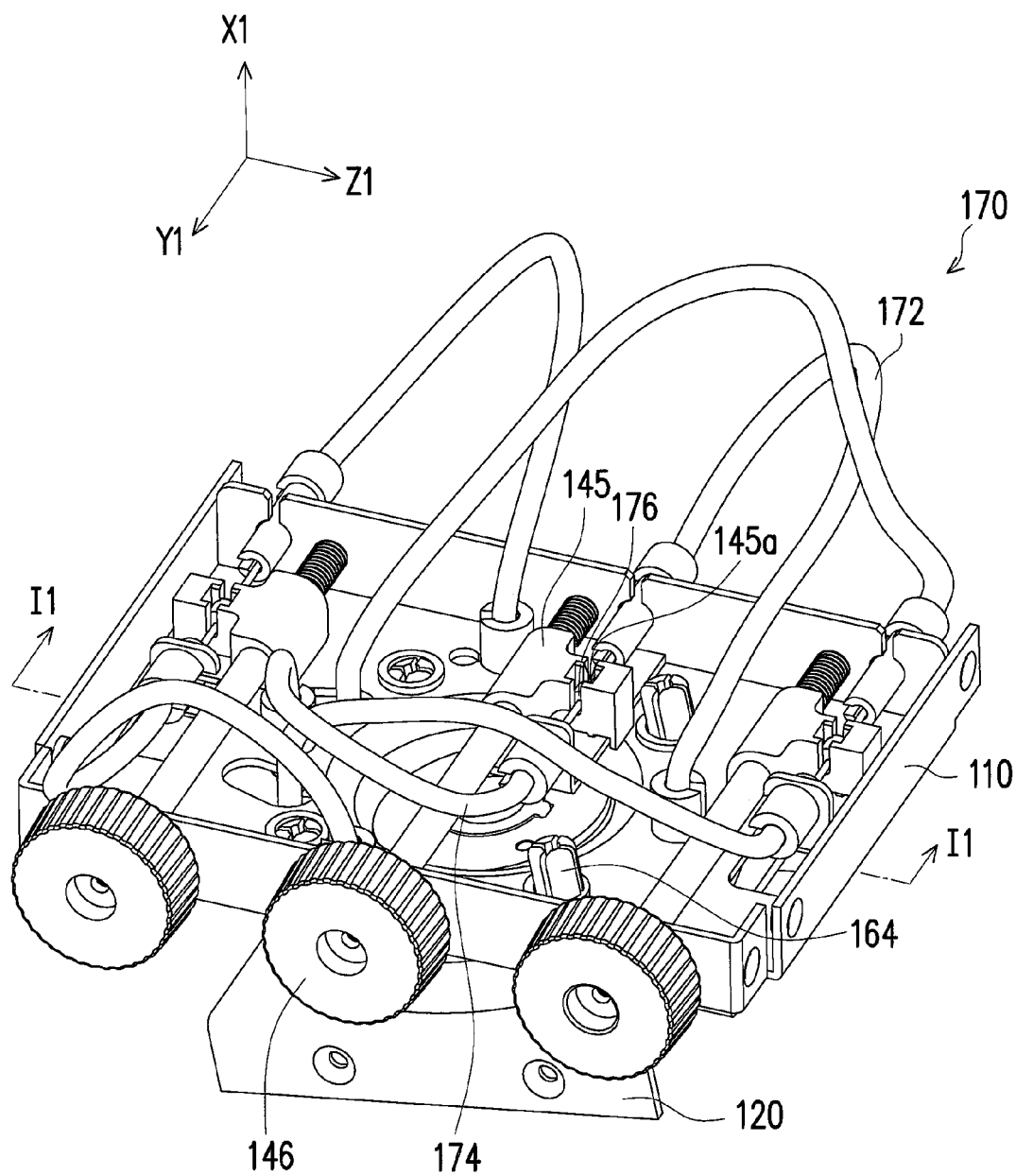
FIG. 5A is a schematic view showing the adjusting apparatus in FIG. 1 rotating around the second axis.
Figure 5B:
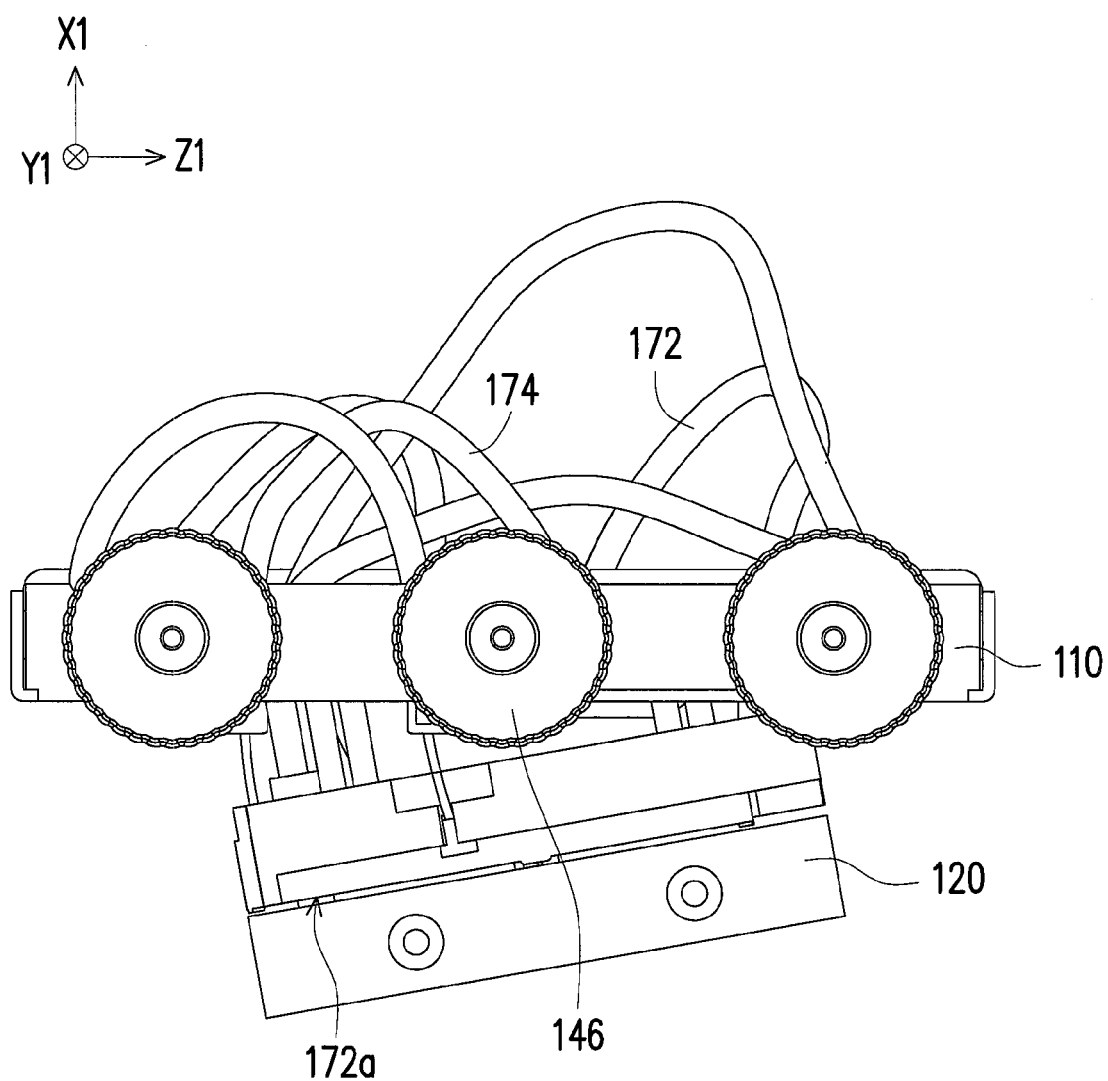
FIG. 5B is a front view of the adjusting apparatus in FIG. 5A.
Figure 5C:
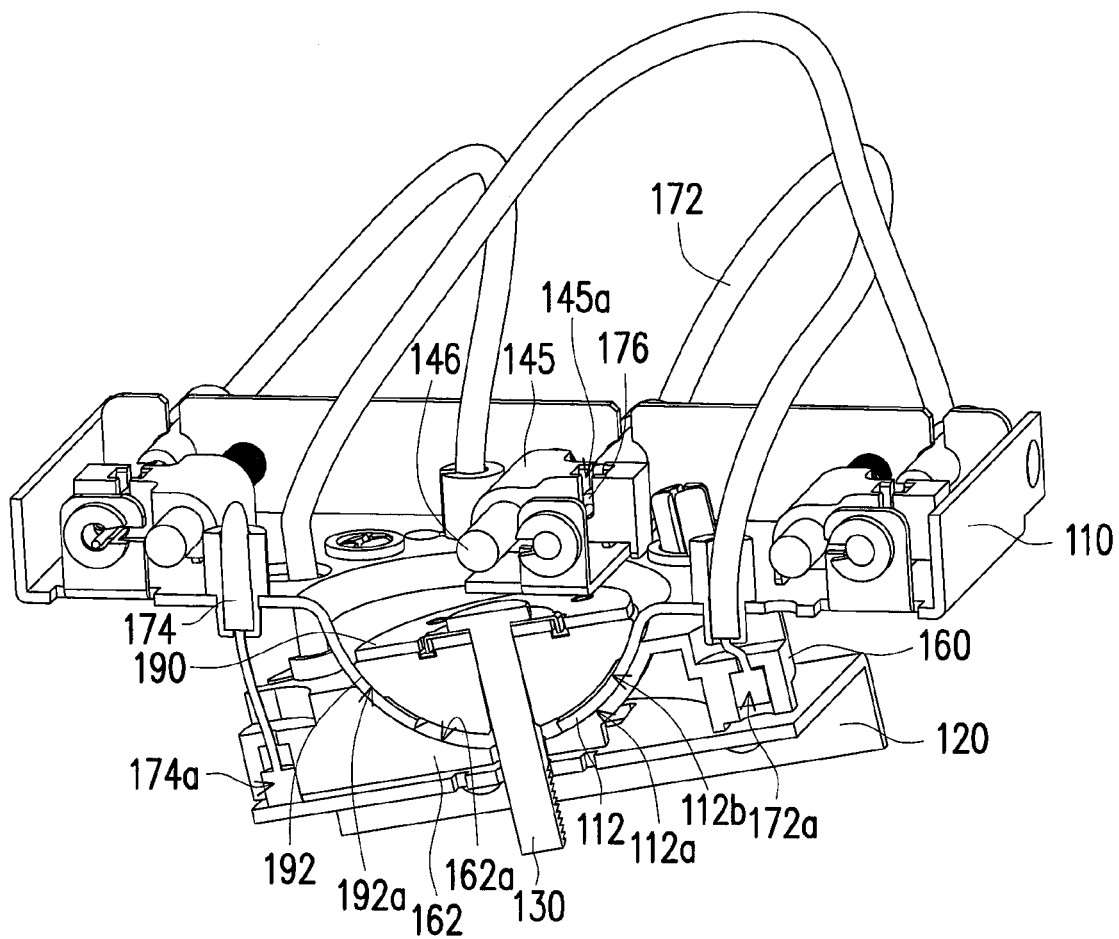
FIG. 5C is a cross-sectional view taken along line I1-I1 of the adjusting apparatus in FIG. 5A.

FIG. 5A is a schematic view showing the adjusting apparatus in FIG. 1 rotating around the second axis. FIG. 5B is a front view of the adjusting apparatus in FIG. 5A. FIG. 5C is a cross-sectional view taken along line I1-I1 of the adjusting apparatus in FIG. 5A. Referring to FIG. 5A, FIG. 5B and FIG. 5C, when the second adjusting rod 146 is rotated, the second adjusting base 145 moves along the second axis Y1 relative to the first base 110, for dragging the third section 172 of the second cable 170, such that the second end portion 172a of the third section 172 drives the pivot base 160 and the second base 120 to rotate relative to the first base 110 around the second axis Y1. Thus, the second object 20 (referring to FIG. 1) rotates in one direction around the second axis Y1 relative to the first object 10 (referring to FIG. 1).

On the contrary, when the second adjusting rod 146 drives the second adjusting base 145 to move along the second axis Y1 in a reverse direction, the fourth section 174 of the second cable 170 is dragged, such that the second end portion 174a of the fourth section 174 drives the pivot base 160 and the second base 120 to rotate relative to the first base 110 around the second axis Y1 (not shown). Thus, the second object 20 rotates in another direction around the second axis Y1 relative to the first object 10.

Figure 6A:
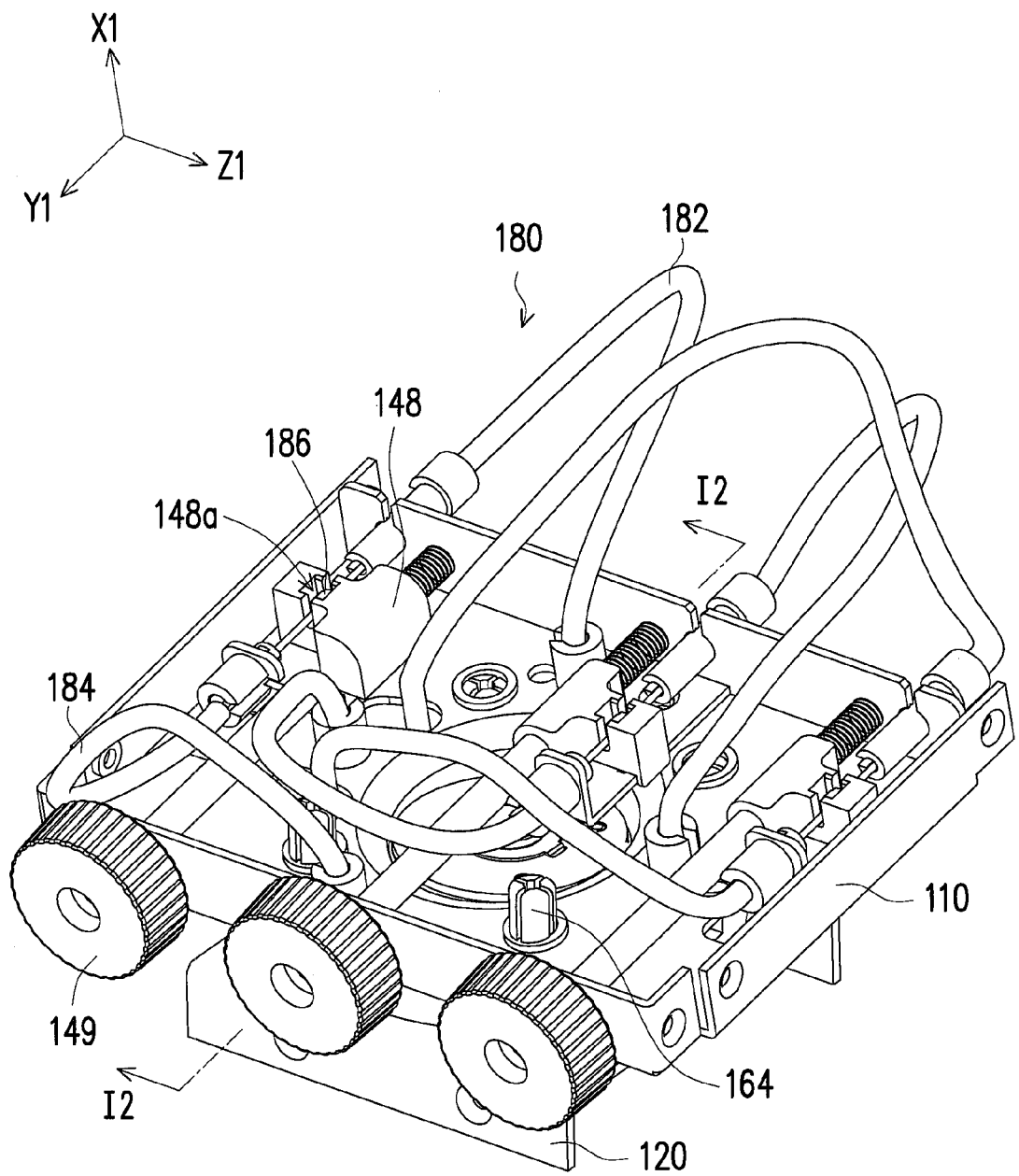
FIG. 6A is a schematic view showing the adjusting apparatus in FIG. 1 rotating around the third axis.
Figure 6B:
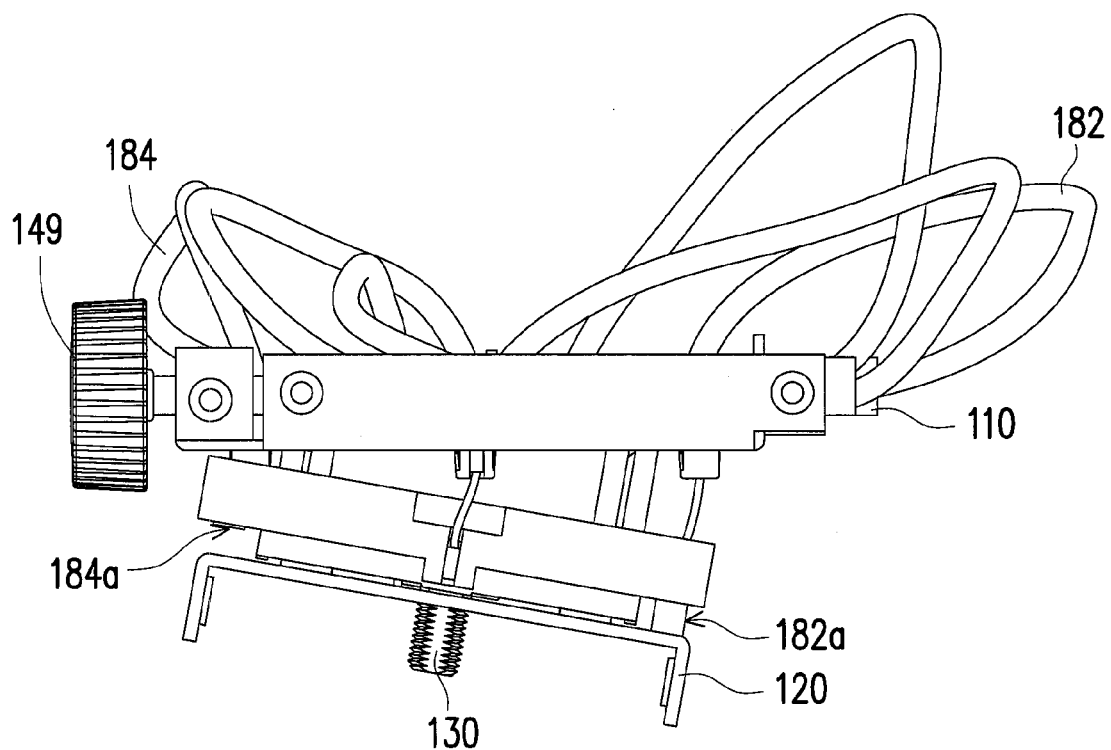
FIG. 6B is a side view of the adjusting apparatus in FIG. 6A.
Figure 6C:
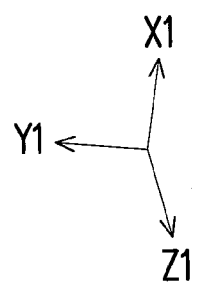
FIG. 6C is a cross-sectional view taken along line 12-12 of the adjusting apparatus in FIG. 6A.
Figure 6C:
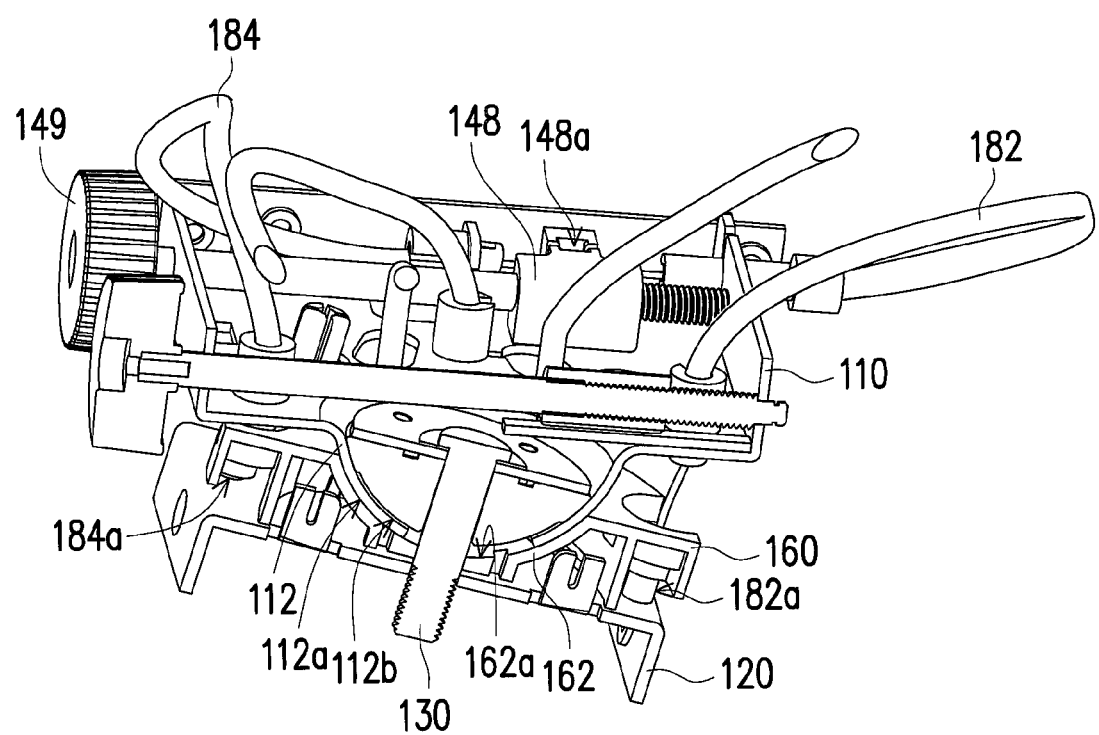

FIG. 6A is a schematic view showing the adjusting apparatus in FIG. 1 rotating around the third axis. FIG. 6B is a side view of the adjusting apparatus in FIG. 6A. FIG. 6C is a cross-sectional view taken along line I2-I2 of the adjusting apparatus in FIG. 6A. Referring to FIG. 6A, FIG. 6B and FIG. 6C, when the third adjusting rod 149 is rotated, the third adjusting base 148 moves along the second axis Y1 in a reverse direction relative to the first base 110, for dragging the sixth section 184 of the third cable 180, such that the third end portion 184a of the sixth section 184 drives the pivot base 160 and the second base 120 to rotate relative to the first base 110 around the third axis Z1. Thus, the second object 20 (referring to FIG. 1) rotates in one direction around the third axis Z1 relative to the first object 10 (referring to FIG. 1).

On the contrary, when the third adjusting rod 149 drives the third adjusting base 148 to move along the second axis Y1 relative to the first base 110, the fifth section 182 of the third cable 180 is dragged, such that the third end portion 182a of the fifth section 182 drives the pivot base 160 and the second base 120 to rotate relative to the first base 110 around the third axis Z1 (not shown). Thus, the second object 20 rotates in another direction around the third axis Z1 relative to the first object 10.

In such configuration mentioned above, by rotating of the first adjusting rod 142, the second adjusting rod 146 and the third adjusting rod 149, the second object 20 may rotate around any of the first axis X1, the second axis Y1 and the third axis Z1 relative to the first object 10. Accordingly, the apparatus meets the requirement for three-dimensional adjusting the projector for multi angles.

Referring to FIG. 1, FIG. 2, FIG. 5A and FIG. 6A, the second adjusting base 145 and the third adjusting base 148 of the embodiment respectively have a second recess portion 145a and a third recess portion 148a, the second cable 170 further has a second protruding portion 176 which connects the third section 172 and the fourth section 174, and the third cable 180 further has a third protruding portion 186 which connects the fifth section 182 and the sixth section 184. The second protruding portion 176 and the third protruding portion 186 are respectively accommodated in the second recess portion 145a and the third recess portion 148a, and the related detailed description is similar to the first protruding portion 156 being accommodated in the first recess portion 142a and thus omitted herein.

It should be described that the second adjusting rod 146 and the third adjusting rod 149 are respectively rotatably disposed and passes through the first base 110. However, the second adjusting rod 146 or the third adjusting rod 149 may not move forward or move back relative to the first base 110 when being rotated. In addition, the second adjusting rod 146 and the third adjusting rod 149 respectively have a second thread 146a and a third thread 149a, and the second adjusting base 145 and the third adjusting base 148 correspondingly have a second threaded hole 145b and a third threaded hole 148a, wherein the second thread 146a and the third thread 149a are respectively engaged with the second threaded hole 145b and the third threaded hole 148b. Therefore, when the second adjusting rod 146 or the third adjusting rod 149, or both of them is/are rotated, the second adjusting base 145 or the third adjusting base 148 or both of them may move relative to the first base 110, and drives the second cable 170, the third cable 180, or the combination thereof.

Referring to FIG. 2, FIG. 3, FIG. 5C and FIG. 6C, the first base 110 of the embodiment has a first pivoting portion 112 facing the pivot base 160, and the pivot base 160 has a second pivoting portion 162 corresponding to the first pivoting portion 112. The first pivoting portion 112 and the second pivoting portion 162 respectively have a first pivoting surface 112a and a second pivoting surface 162a. The first pivoting surface 112a and the second pivoting surface 162a are rotatably connected, and the shapes of the first pivoting surface 112a and the second pivoting surface 162a are complementary to each other.

It should be noted that, the first pivoting surface 112a and the second pivoting surface 162a of the embodiment are respectively shape-complementary hemispherical surfaces. Therefore, the pivot base 160 is rotated relative to the first base 110 smoothly. That is, the second object 20 can rotate relative to the first object 10 smoothly. Accordingly, possibility of idle rotation in the adjusting apparatus 100 may be reduced. In addition, to make the pivot base 160 rotate more smoothly, first base 110 may be made of metal, and the pivot base 160 may be manufactured by using elastic plastic material.

In addition, in the embodiment, the adjusting apparatus 100 further includes a pressing member 190, wherein the pivot shaft 130 passes through the pressing member 190, so that the first base 110 is held between the pivot base 160 and the pressing member 190. Specifically, the pressing member 190 has a third pivoting portion 192 facing the first base 110, and the third pivoting portion 192 has a third pivoting surface 192a. The first pivoting portion 112 further has a fourth pivoting surface 112b corresponding to the first pivoting surface 112a. The third pivoting surface 192a and the fourth pivoting surface 112b are rotatably connected, and the shapes of the third pivoting surface 192a and the fourth pivoting surface 112b are complementary to each other. In this embodiment, the third pivoting surface 192a and the fourth pivoting surface 112b of the embodiment are respectively hemispherical surfaces. In such configuration, when the pivot base 160 and the pressing member 190 are rotated around the second axis Y1 or the third axis Z1 relative to the first base 110, the third pivoting surface 192a and the fourth pivoting surface 112b may guide the first base 110 to rotate relative to the pivot base 160 and the pressing member 190.

Additionally, the third pivoting portion 192 of the pressing member 190 and the first pivoting portion 112 of the first base 110 partially contact, so that too many friction which causes rough operation when the pressing member 190 and the first base 110 relatively move may be prevented.

Referring to FIG. 2, FIG. 5A and FIG. 6A, the pivot base 160 of the embodiment has a plurality of guiding posts 164 disposed at a periphery of the pivot base 160. The first base 110 has a plurality of through holes 114 corresponding to the guiding posts 164. When the pivot base 160 is rotated relative to the first base 110, the guiding posts 164 slide within the corresponding through hole 114. As such, the rotation of the pivot base 160 relative to the first base 110 may be guided. Moreover, since each of the guiding posts 164 is parallel to the first axis X1, the pivot base 160 may be restricted to rotate around the first axis X1 when rotating on the second base 120 relative to the first base 110. In such configuration, sluggish rotation of the pivot base 160 which causes feeling of idle rotation may be prevented.

In addition, each of the guiding posts 164 has a groove 164a. When each of the guiding posts 164 slides within the corresponding through hole 114, the guiding post 164 is partially deformed via the groove 164a and propped against within the through hole 114. As such, the rotation of the pivot base 160 may also be smooth.

In light of the foregoing, in the adjusting apparatus of the disclosure, through the first adjusting base driving one section of the first cable, the second base may be rotated around the first axis relative to the first base, thus the second object and the first object change the relative positions. Thus, the adjusting apparatus may change the relative positions between the first object and the second object by merely using the simple structure, so that the second object may perform two-direction rotation on the first axis. Accordingly, disposing complex structure is unnecessary for the adjusting apparatus, thus malfunction possibility of the adjusting apparatus may be reduced. Furthermore, since the adjusting apparatus is simple in structure, number of parts and manufacturing cost may be reduced. Furthermore, when the adjusting apparatus includes the pivot base, the adjusting rods, the adjusting bases and the cables, the second object may perform multi-axial rotation in two-direction rotation relative to the first object. Moreover, when each of the cables has the protruding portion and the corresponding adjusting base has the recess portion, the convenience of the assembling of the cables and the corresponding adjusting bases may be improved and the risk of cable being loosed may be reduced. Accordingly, reliability of the adjusting apparatus may be ensured. Furthermore, when the first pivoting surface of the first base and the second pivoting surface of the pivot base are hemispherical surfaces, smoothness of the operation of the pivot base during rotation may also be enhanced.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An adjusting apparatus, comprising:
    a first base, used to fix a first object;
    a second base, disposed under the first base, and used to assemble a second object;
    a pivot shaft, wherein the first base and the second base pivot through the pivot shaft, and the pivot shaft is parallel to a first axis;
    an adjusting unit, comprising:
        a first adjusting rod, parallel to a second axis and rotatably disposed on the first base;
        a first adjusting base, sleeving on the first adjusting rod and configured to move back and forth along a direction parallel to the second axis; and
    a first cable, having a first section and a second section, wherein the first section and the second section respectively have a first end portion, and the first end portions are fixed to the second base, and the first adjusting base holds the first section and the second section,
    wherein when the first adjusting rod is rotated, the first adjusting base moves on the second axis relative to the first base, for dragging the first end portion of the first section or the first end portion of the second section, such that the second base is rotated relative to the first base around the first axis.

2. The adjusting apparatus as claimed in claim 1, wherein the first adjusting base has a first recess portion, the first cable further has a first protruding portion, and the first protruding portion connects the first section and the second section and is accommodated in the first recess portion.

3. The adjusting apparatus as claimed in claim 1, wherein the first adjusting rod has a first thread and the first adjusting base has a first threaded hole, and the first thread is engaged with the first threaded hole, wherein when the first adjusting rod is rotated, no relative displacement exists between the first adjusting rod and the first base.

4. The adjusting apparatus as claimed in claim 1, wherein the second base has two bent plates corresponding to the first end portion of the first section and the first end portion of the second section, each of the bent plates has a position limiting narrow slot, the first end portion of the first section and the first end portion of the second section respectively have a protruding block, and the protruding blocks are correspondingly inserted in the position limiting narrow slots.

5. The adjusting apparatus as claimed in claim 1, further comprising a pivot base and a second cable, wherein the pivot base is fixed on the second base, and the pivot shaft passes through the pivot base so that the first base is pivoted to the pivot base, the second cable has a third section and a fourth section, wherein the third section and the fourth section respectively have a second end portion, and the second end portions are fixed to two opposite sides of the pivot base, wherein the adjusting unit further comprises a second adjusting base and a second adjusting rod, wherein the second adjusting rod is arranged along a third axis, which is perpendicular to the first axis or the second axis, and rotatably disposed on the first base, wherein the second adjusting base, being configured to move back and forth along a direction parallel to the second axis, sleeves on the second adjusting rod and holds the third section and the fourth section, wherein when the second adjusting rod is rotated, the second adjusting base moves relative to the first base on the second axis, for dragging the second end portion of the third section or the second end portion of the fourth section, such that the pivot base and the second base are rotated relative to the first base around the second axis.

6. The adjusting apparatus as claimed in claim 5, wherein the second adjusting base has a second recess portion, the second cable further has a second protruding portion, and the second protruding portion connects the third section and the fourth section and is accommodated in the second recess portion.

7. The adjusting apparatus as claimed in claim 5, wherein the second adjusting rod has a second thread and the second adjusting base has a second threaded hole, and the second thread is engaged with the second threaded hole, wherein when the second adjusting rod is rotated, no relative displacement exists between the second adjusting rod and the first base.

8. The adjusting apparatus as claimed in claim 5, further comprising a third cable, wherein the third cable has a fifth section and a sixth section, the fifth section and the sixth section respectively have a third end portion, and the third end portions are fixed to another two opposite sides of the pivot base, wherein the adjusting unit further comprises a third adjusting base and a third adjusting rod, the third adjusting rod is rotatably disposed on the first base, and the third adjusting base sleeves on the third adjusting rod, wherein the third adjusting base is configured to move back and forth along a direction parallel to the second axis and holds the fifth section and the sixth section, wherein the first adjusting rod and the third adjusting rod are located at two sides of the second adjusting rod, wherein when the third adjusting rod is rotated, the third adjusting base moves relative to the first base on the second axis, for dragging the third end portion of the fifth section or the third end portion of the sixth section, such that the pivot base and the second base are rotated relative to the first base around the third axis.

9. The adjusting apparatus as claimed in claim 8, wherein the third adjusting base has a third recess portion, the third cable further has a third protruding portion, and the third protruding portion connects the fifth section and the sixth section and is accommodated in the third recess portion.

10. The adjusting apparatus as claimed in claim 8, wherein the third adjusting rod has a third thread and the third adjusting base has a third threaded hole, and the third thread is engaged with the third threaded hole, wherein when the third adjusting rod is rotated, no relative displacement exists between the third adjusting rod and the first base.

11. The adjusting apparatus as claimed in claim 5, wherein the pivot base has at least one guiding post disposed at a periphery of the pivot base, and the first base has a through hole corresponding to the at least one guiding post, wherein when the pivot base is rotated relative to the first base, the at least one guiding post slides within the through hole.

12. The adjusting apparatus as claimed in claim 11, wherein the at least one guiding post has a groove, and when the at least one guiding post slides within the through hole, the at least one guiding post is partially deformed via the groove and propped against within the through hole.

13. The adjusting apparatus as claimed in claim 5, wherein the first base has a first pivoting portion facing the pivot base, and the pivot base has a second pivoting portion corresponding to the first pivoting portion, wherein the first pivoting portion and the second pivoting portion respectively have a first pivoting surface and a second pivoting surface, which are rotatably connected, and a shape of the first pivoting surface and a shape of the second pivoting surface are complementary to each other.

14. The adjusting apparatus as claimed in claim 13, wherein the first pivoting surface and the second pivoting surface are respectively hemispherical surfaces.

15. The adjusting apparatus as claimed in claim 13, further comprising a pressing member, wherein the pivot shaft passes through the pressing member, so that the first base is held between the pivot base and the pressing member.

16. The adjusting apparatus as claimed in claim 15, wherein the pressing member has a third pivoting portion, having a third pivoting surface, facing the first base, and the first pivoting portion further has a fourth pivoting surface corresponding to the first pivoting surface, wherein the third pivoting surface and the fourth pivoting surface are rotatably connected, and a shape of the third pivoting surface and a shape of the fourth pivoting surface are complementary to each other.

17. The adjusting apparatus as claimed in claim 16, wherein the third pivoting surface and the fourth pivoting surface are respectively hemispherical surfaces.

18. The adjusting apparatus as claimed in claim 16, wherein the third pivoting surface and the first pivoting surface partially contact.

* * * * *